Figure 1:
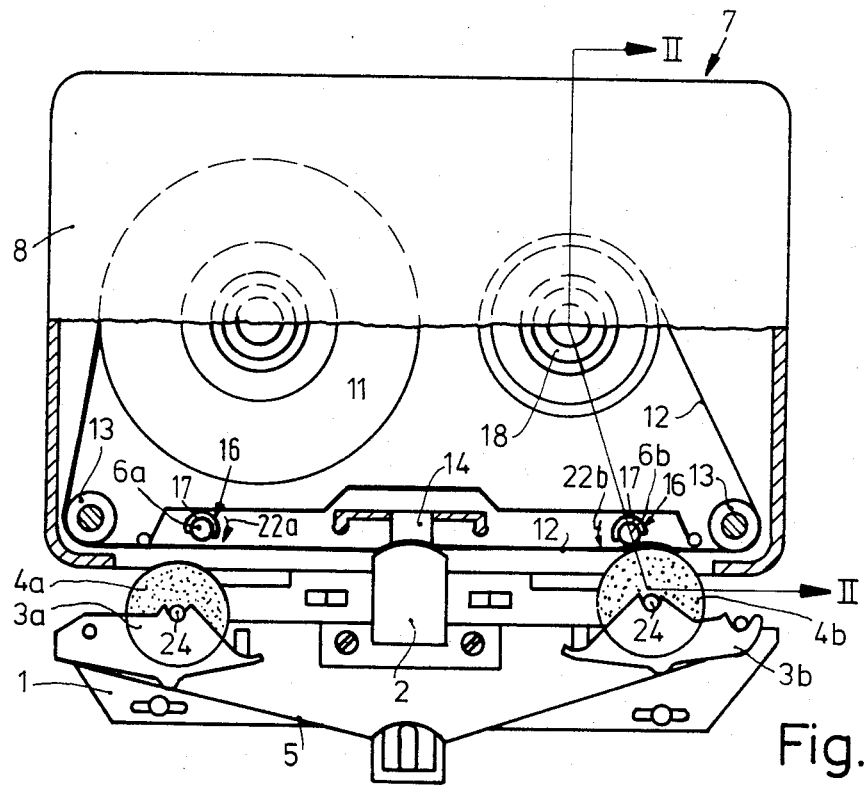

United States Patent [19]

Ruyten

[11] Patent Number: 4,614,289
[45] Date of Patent: Sep. 30, 1986

[54] MAGNETIC-TAPE-CASSETTE APPARATUS COMPRISING AT LEAST ONE CAPSTAN

[75] Inventor: Henricus M. Ruyten, Wetzlar, Fed. Rep. of Germany

[73] Assignee: U.S. Philips Corporation, New York, N.Y.

[21] Appl. No.: 731,635

[22] Filed: May 7, 1985

[30] Foreign Application Priority Data

May 12, 1984 [DE] Fed. Rep. of Germany ....... 3417730

[51] Int. Cl.⁴ ................... G11B 23/023; G11B 23/087
[52] U.S. Cl. .................................... 226/181; 242/198; 384/292
[58] Field of Search ............................. 226/181, 188; 242/198–200; 384/291, 292

[56] References Cited

U.S. PATENT DOCUMENTS

| 1,823,437 | 9/1931 | Cooper | 384/292 |
| 1,877,495 | 9/1932 | Cater | 384/292 X |
| 2,673,131 | 3/1954 | Kistler | 384/292 X |
| 3,603,595 | 9/1971 | Wada | 242/200 X |
| 3,967,769 | 7/1976 | Matsumoto | 226/194 |
| 4,455,001 | 6/1984 | Schilke et al. | 242/192 |
| 4,508,280 | 4/1985 | Hayosh et al. | 226/181 X |

FOREIGN PATENT DOCUMENTS 374609 5/1984 Austria .
1934733 1/1971 Fed. Rep. of Germany .

Primary Examiner—Donald Watkins
Attorney, Agent, or Firm—Robert T. Mayer

[57] ABSTRACT

The invention relates to a magnetic-tape-cassette apparatus comprising at least one capstan (6a, 6b) which in conjunction with a pressure roller (4a, 4b) drives the magnetic tape (12). The capstan is journalled in a bearing (19) which is mounted in a deck plate (15) of the apparatus by means of a lower sleeve part (18). The lower part (18) is formed with a bore through which the capstan extends and adjoins an upper sleeve part (17) which at least at the capstan side which is remote from the pressure roller (4a, 4b) surrounds the capstan (6a, 6b) above the deck plate (15), to strip off the tape. The lower part (18) and the upper part (17) are formed in one piece of a plastics material. The bearing (19) is formed as a spiral-groove bearing in the inner wall (18a) of the bore in the lower sleeve part.

18 Claims, 4 Drawing Figures

MAGNETIC-TAPE-CASSETTE APPARATUS COMPRISING AT LEAST ONE CAPSTAN

The invention relates to a magnetic-tape-cassette apparatus comprising at least one capstan which in conjunction with a pressure roller drives a magnetic tape and which is journalled in a bearing which is supported in a deck plate of the apparatus by means of a lower sleeve part which is formed with a bore through which the capstan extends and which adjoins an upper sleeve part, which surrounds the capstan above the deck plate, at least at the side which is remote from the pressure roller, to strip off the magnetic tape.

Such a magnetic-tape-cassette apparatus is disclosed in U.S. Pat. No. 3,967,769. The capstan extends through the deck plate into an area where the magnetic-tape cassette is inserted. After insertion of the magnetic-tape cassette the capstan then projects into the magnetic-tape cassette. An upper sleeve part surrounds the capstan partly. This part surrounds the capstan at the side which is remote from the pressure roller of the apparatus and thereby prevents the tape from being wrapped around the capstan. If the tape wraps itself around the capstan this is very annoying because the cassette can then no longer be removed from the apparatus and in the most unfavorable case the apparatus may even have to be disassembled. If the apparatus is mounted in a car, this means that in such a situation the apparatus also has to be removed from the car.

In the known construction a separate capstan bearing is mounted underneath the upper sleeve part. This part together with a lower part and the capstan bearing are mounted in the deck plate. This construction is relatively expensive and difficult to mount. Moreover, the diameter of the mounting hole for the lower sleeve part in the deck plate must be comparatively large because the bearing is accommodated in this lower part.

It is the object of the invention to provide a magnetic-tape-cassette apparatus of the type defined in the opening paragraph in which a separately manufactured and mounted bearing is dispensed with.

According to the invention this object is achieved in that the lower sleeve part and the upper sleeve part are manufactured in one piece from the same material, the bearing being constructed as a spiral groove bearing in the inner wall of the bore in the lower sleeve part.

In this way a separate bearing may be dispensed with and the lower part can be of smaller diameter. The upper part together with the bearing can be manufactured and mounted in one operation. The advantage of this construction is that a simple plastics material may be employed, which need not be a real bearing material. The bearing grease for the lubrication remains in the spiral grooves of the bearing during the entire life of the apparatus. Thus, a proper lubrication and smooth running of the capstan are guaranteed by means of a simple construction.

From AT-PS No. 374,609 it is known to form a lower part and a part connecting it to an upper bearing member for the capstan integrally from the same material. However, how the capstan is journalled in the lower part is not described. Moreover, the connecting part does not function as a means for stripping off the magnetic tape.

In accordance with a further embodiment of the invention the bearing extends axially above the deck plate into the housing in an inserted magnetic-tape cassette, stopping short of the lower edge of the tape. By journalling the capstan up to a point near the lower tape edge it is ensured that the capstan is adequately supported and cannot bend under the pressure exerted by the pressure roller. This is another advantage of the one-piece construction of the bearing part and the upper part.

In accordance with another embodiment of the invention the bearing part and the upper part are molded on the deck plate. The unit comprising the upper part and the bearing part can then be molded on simultaneously with further bearing means and bearing pins to be moulded on the deck plate during the molding operation. In this way the unit can be manufactured cheaply and with a high precision.

In still another embodiment of the invention the upper part comprises two bounding edges which face the pressure roller and which extend parallel to a plane which is tangential to the pressure-roller at the point of contact between it and the capstan. Thus, the upper part can surround the capstan over an as large as possible portion of its circumference.

In yet another embodiment of the invention the outside of the unit comprising the lower part, the bearing and the upper part tapers down from the deck plate. Such a tapered construction facilitates molding of the unit. It also facilitates sliding the cassette onto the unit.

Figure 2:
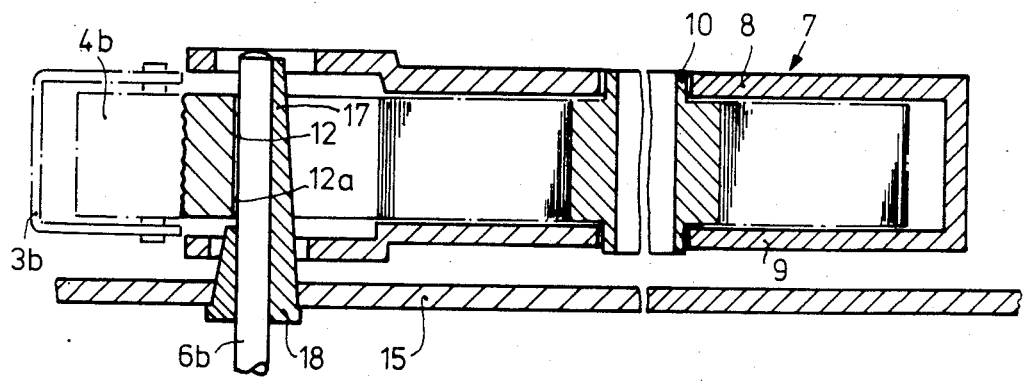
Figure 3:
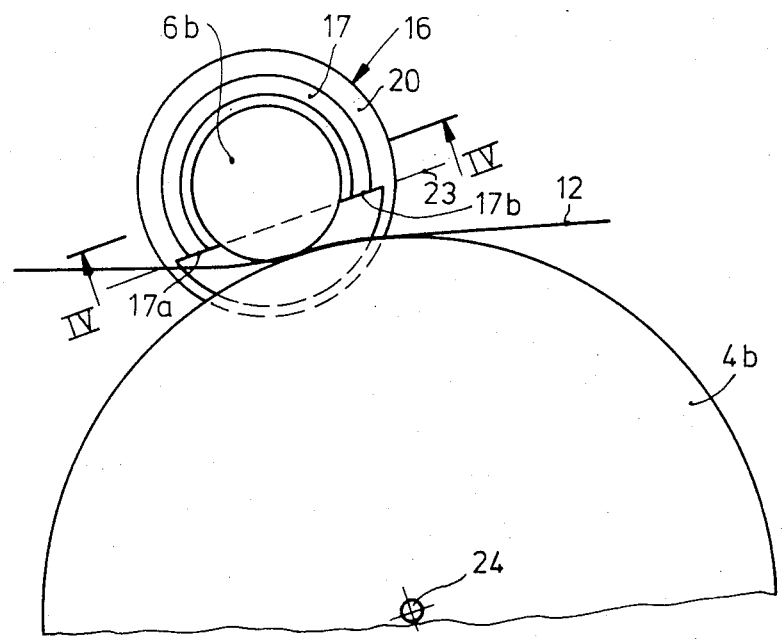
Figure 4:
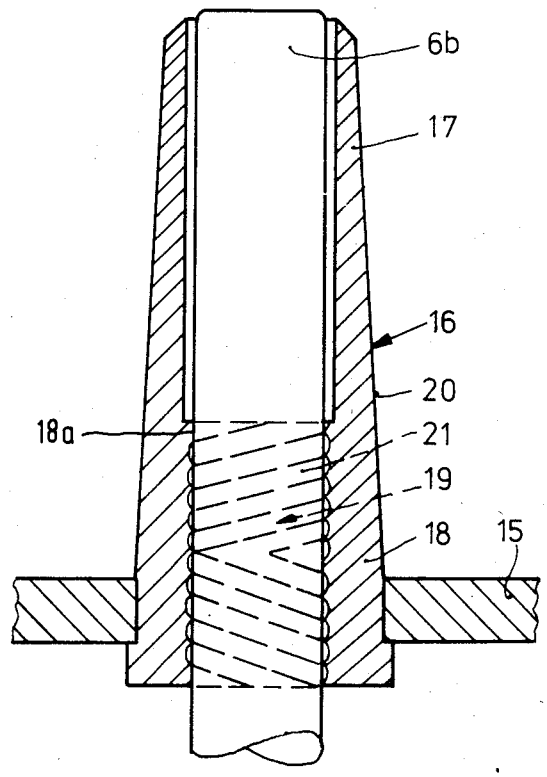

An embodiment of the invention will now be described in more detail, by way of example, with reference to the accompanying drawings. In the drawings:

FIG. 1 is a plan view showing a part of a magnetic-tape cassette apparatus and a magnetic-tape cassette, FIG. 2 is a section view of the apparatus and the cassette, taken on the line II—II in FIG. 1, showing the unit comprising the capstan bearing and the upper sleeve part, FIG. 3 is a plan view of the capstan and the unit comprising the upper sleeve part and bearing together with the pressure roller and a length of magnetic tape, and FIG. 4 is a sectional view of the unit comprising the capstan bearing and the upper sleeve portion, taken on the line IV—IV in FIG. 3.

The magnetic-tape-cassette apparatus shown in FIG. 1 comprises a head-mounting plate 1 carrying a magnetic head 2. Further, the head-mounting plate 1 carries pressure rollers 4a and 4b mounted by means of holders 3a and 3b. A spring 5 on the mounting plate 1 urges the pressure rollers 4a, 4b towards the capstans 6a, 6b via the holders 3a, 3b. The head-mounting plate can be tilted in a manner, not shown, in such a way that either the pressure roller 4b or the pressure roller 4a can be pressed against the associated capstans 6b and 6a, respectively. In FIG. 1 the pressure roller 4b is urged against the capstan 6b. This is for example the direction for forward transport, and when the pressure roller 4a is pressed against the capstan 6a the apparatus is set to reverse operation.

In the situation shown in FIG. 1 a magnetic-tape cassette 7 has been inserted into the apparatus, which cassette is shown in sectional view in FIG. 2. The cassette comprises an upper wall 8 and a lower wall 9, between which two reel hubs 10, 11 are arranged. A magnetic tape 12 is wound on the reel hubs. The tape extends between the hubs 10, 11 via guide rollers 13. Between the guide rollers it runs between the pressure rollers 4 and the capstans 6. A felt pad 14 presses the tape against the magnetic head 2. The cassette is of the standard Compact-cassette type. It is obvious that any other type of magnetic-tape cassette may be used.

The apparatus comprises a deck plate 15 carrying all the essential parts at the upper side of the apparatus. The parts are preferably mounted by molding on the holders, pins, bearings and the like. The advantage of this is that constructional units can be manufactured economically with a high accuracy. Subsequent mounting operations are thereby reduced to a minimum.

Left hand and right-hand units are molded on the deck plate 15, which units each comprise an upper part 17 and a lower part 18 in which a bore is formed through which the capstan 6a, 6b extends. The inner bore wall 18a functions as a bearing 19 for the capstan 6a, 6b. This construction is clearly visible in FIG. 4. The outer wall 20 of the unit tapers down away from the mounting plate 15. The bearing 19 is constructed as a spiral-groove bearing. The grooves 21 of the bearing 19 are filled with grease. The capstans 6a and 6b rotate in the directions indicated by the arrows 22a and 22b, respectively. In order to ensure that the grease remains in the grooves 21 the grooves in the upper side and the lower side of the bearing extend in a helical pattern towards each other in the direction of rotation. The grooves 21 in the left-hand bearing extend oppositely to the grooves in the right-hand bearing. Each bearing 19 projects axially from the deck plate into the housing of an inserted magnetic-tape cassette 7, stopping short of the lower edge of the tape 12. This is clearly visible in FIG. 2. In FIG. 2 the lower tape edge bears the reference numeral 12a. The sleeve part 17 is integral with the lower part 18 which, as can be seen clearly in FIGS. 2 and 4 extends upwardly via the lower part 18 and bearing 19, nearly up to the upper end of the capstan 6a, 6b. The upper sleeve part 17 surrounds the capstan 6a, 6b with a small clearance. It surrounds the capstan 6a, 6b only partly, i.e. only at the side which is remote from the pressure roller. The upper part surrounds the capstan over an angle of approximately 220° to 235°. At the side facing the pressure roller 4a, 4b the upper sleeve part 17 is bounded by two edges 17a, 17b which extend parallel to a plane 23 which is tangential to the pressure roller axis 24.

If during operation the magnetic tape runs between the capstan and the pressure roller the magnetic tape may stick to the capstan when this capstan is soiled. As a result of this, the magnetic tape may not entirely come off the capstan at the exit side and is pulled along. Without the upper sleeve part the tape may then wrap itself around the capstan. When the upper sleeve part 17 is present the tape is lifted off the capstan and cannot wind itself around the capstan. Constructing the lower part 17 the bearing 19 and the upper part 17 as one unit of a plastics material enables the unit to be mounted in an economic manner, for example by forming it at the same time that the other mounting portions are molded on the deck plate 15. The spiral groove bearing need not be made of a special plastics material. The lower part 18, the bearing 19 and the upper part 17 are molded from the same material as the other mounting elements on the deck plate 15. The lower part 18 and thus the bearing 19 have such a height that the capstan is journalled up to a point just below the magnetic tape and cannot be pressed away in a radial direction by the pressure roller 4a and 4b. This precludes bending and hence eccentric rotation of the capstan. Since it is no longer necessary to use a separate bearing of another material, the lower part can have such a small diameter that it can pass through the opening in a standard compact cassette, stopping short of the lower edge of the magnetic tape 12. Yet, the lower part is disposed freely inside the standard opening in the cassette.

What we claim is:

1. A magnetic tape cassette apparatus comprising a deck plate, at least one rotatable capstan extending above said deck plate, a pressure roller cooperating with said capstan and supported by said deck plate for rotation with said capstan, a lower sleeve part with a bore and an upper sleeve part, said capstan extending through said bore and having its part extending above said deck plate surrounded by said upper sleeve part at least on the side of said capstan remote from said pressure roller, said lower and upper sleeve parts consisting of one piece of material and said lower part having a spiral groove bearing formed in the inner wall of its bore.

2. A magnetic-tape-cassette apparatus as claimed in claim 1, characterized in that the bearing (19) extends axially above the deck plate (15) into the housing of an inserted magnetic-tape cassette (7), stopping short of the lower edge (12a) of the tape.

3. A magnetic-tape-cassette apparatus as claimed in claim 1, characterized in that the bearing (19) and the upper part (17) are molded on the deck plate (15).

4. A magnetic-tape-cassette apparatus as claimed in claim 1, characterized in that the upper part (17) comprises two bounding edges (17a, 17b) which face the pressure roller (4a, 4b) and which extend parallel to a plane (23) which is tangential to the pressure-roller at the point of contact between it and said capstan.

5. A magnetic-tape-cassette apparatus as claimed in claim 1, characterized in that the outside (20) of the unit comprising the lower part (18), the bearing (19) and the upper part (17) tapers down from the deck plate (15).

6. A magnetic-tape-cassette apparatus as claimed in claim 1, characterized in that the capstan is enclosed over an angle of 220° to 235°.

7. A magnetic-tape-cassette apparatus as claimed in claim 2, characterized in that the bearing and the upper part are molded on the deck plate.

8. A magnetic-tape-cassette apparatus as claimed in claim 2, characterized in that the upper part comprises two bounding edges which face the pressure roller and which extend parallel to a plane which is tangential to the pressure-roller at the point of contact between it and said capstan.

9. A magnetic-tape-cassette apparatus as claimed in claim 3, characterized in that the upper part comprises two bounding edges which face the pressure roller and which extend parallel to a plane which is tangential to the pressure-roller at the point of contact between it and said capstan.

10. A magnetic-tape-cassette apparatus as claimed in claim 7, characterized in that the upper part comprises two bounding edges which face the pressure roller and which extend parallel to a plane which is tangential to the pressure-roller at the point of contact between it and said capstan.

11. A magnetic-tape-cassette apparatus as claimed in claim 2, characterized in that the outside of the unit comprising the lower part, the bearing and the upper part tapers down from the deck plate.

12. A magnetic-tape-cassette apparatus as claimed in claim 3, characterized in that the outside of the unit comprising the lower part, the bearing and the upper part tapers down from the deck plate.

13. A magnetic-tape-cassette apparatus as claimed in claim 4, characterized in that the outside of the unit comprising the lower part, the bearing and the upper part tapers down from the deck plate.

14. A magnetic-tape-cassette apparatus as claimed in claim 8, characterized in that the outside of the unit comprising the lower part, the bearing and the upper part tapers down from the deck plate.

15. A magnetic-tape-cassette apparatus as claimed in claim 9, characterized in that the outside of the unit comprising the lower part, the bearing and the upper part tapers down from the deck plate.

16. A magnetic-tape-cassette apparatus as claimed in claim 10, characterized in that the outside of the unit comprising the lower part, the bearing and the upper part tapers down from the deck plate.

17. A magnetic-tape-cassette apparatus as claimed in claim 2, characterized in that the capstan is enclosed over an angle of 220° to 235°.

18. A magnetic-tape-cassette apparatus as claimed in claim 3, characterized in that the capstan is enclosed over an angle of 220° to 235°.

* * * * *